US012549026B2

(12) United States Patent
Binder et al.

(10) Patent No.: US 12,549,026 B2
(45) Date of Patent: Feb. 10, 2026

(54) LOAD DEPENDENT METHOD TO REDUCE QUIESCENT CURRENT DURING MULTI-CELL TO SINGLE-CELL BATTERY REGULATION

(71) Applicant: MICROSOFT TECHNOLOGY LICENSING, LLC, Redmond, WA (US)

(72) Inventors: Julian Arlo Binder, Redwood City, CA (US); Mike Voong, Daly City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 612 days.

(21) Appl. No.: 18/072,540

(22) Filed: Nov. 30, 2022

(65) Prior Publication Data

US 2024/0178688 A1 May 30, 2024

(51) Int. Cl.
*H02J 7/00* (2006.01)
*H02J 7/14* (2006.01)

(52) U.S. Cl.
CPC .......... *H02J 7/0063* (2013.01); *H02J 7/0016* (2013.01); *H02J 7/007182* (2020.01); *H02J 2207/20* (2020.01)

(58) Field of Classification Search
CPC .. H02J 7/0063; H02J 7/007182; H02J 7/0016; H02J 2207/20

(Continued)

(56) References Cited

U.S. PATENT DOCUMENTS 6,879,138 B2 * 4/2005 Dinh ................... H02M 3/1584
323/284
2014/0176024 A1 * 6/2014 Butzmann ............... B60L 58/22
307/10.1

(Continued)

FOREIGN PATENT DOCUMENTS

EP 3764453 A1 1/2021

OTHER PUBLICATIONS

International Preliminary Report on Patentability received for PCT Application No. PCT/US23/033917, mailed on Jun. 12, 2025, 09 pages.

(Continued)

*Primary Examiner* — Alexis B Pacheco
(74) *Attorney, Agent, or Firm* — Scott Y. Shigeta; Newport IP, LLC

(57) ABSTRACT

The techniques disclosed herein may achieve efficient regulation of power delivered from one or more batteries to a circuit or system with a power control device that has two or more operating modes. In a first operating mode, the power control device may select a first power circuit to deliver power to a system load with a first quiescent current, while in a second operating mode the power control device may select at least one additional power circuit to deliver power to the system load with a second quiescent current. The first quiescent current is significantly less than the second quiescent current such that operation of the first power circuit corresponds to a lower power mode than the additional power circuits. An ideal diode circuit may be configured to selectively couple the outputs of each of the power circuits to the system load.

15 Claims, 7 Drawing Sheets

(58) Field of Classification Search
USPC .......................................................... 320/132
See application file for complete search history.

(56) References Cited

U.S. PATENT DOCUMENTS

| | | | |
|---|---|---|---|
| 2019/0176727 A1* | 6/2019 | Haluska | ................ B60R 16/033 |
| 2020/0006716 A1* | 1/2020 | Wagoner | ........... H02J 7/007184 |
| 2020/0395762 A1* | 12/2020 | Blakemore | .............. B60K 6/28 |
| 2021/0167610 A1* | 6/2021 | Yoon | ..................... H02J 7/0016 |

OTHER PUBLICATIONS

"LM66100 5.5-V, 1.5-A 79-mΩ, Low IQ Ideal Diode With Input Polarity Protection", Retrieved From: https://www.ti.com/lit/ds/symlink/lm66100.pdf?ts=1675169270692&ref_url=https%253A%252F%252Fwww.google.com%252F, Mar. 2019, 22 Pages.

"LM66200 1.6 V to 5 V, 2.5-A Dual Ideal Diode With Automatic Switchover", Retrieved from: https://www.ti.com/lit/ds/symlink/lm66200.pdf?ts=1675248947811&ref_url=https%253A%252F%252Fwww.google.com%252F, Nov. 2021, 21 Pages.

"N+1 and ORing Power Rail Controller with Enable", Retrieved from: https://www.ti.com/lit/ds/symlink/tps2419.pdf?ts=1675165779839&ref_url=https%253A%252F%252Fwww.ti.com%252Fpower-management%252Fpower-switches%252Fideal-diodes-oring-controllers%252Fproducts.html, Feb. 2010, 29 Pages.

"TPS241x Full Featured N+1 and ORing Power Rail Controller", Retrieved from: https://www.ti.com/lit/ds/symlink/tps2411.pdf?ts=1675249448488&ref_url=https%253A%252F%252Fwww.google.com%252F, Nov. 2006, 35 Pages.

International Search Report and Written Opinion received for PCT Application No. PCT/US23/033917, Feb. 9, 2024, 12 pages.

\* cited by examiner

LOAD DEPENDENT METHOD TO REDUCE QUIESCENT CURRENT DURING MULTI-CELL TO SINGLE-CELL BATTERY REGULATION

BACKGROUND

Electronic devices may use a variety of battery topologies as a power solution. Some battery topologies may include a number of individual battery cells that are connected together in series, parallel, or a combination of series and parallel battery cells. The available power provided from a battery pack can be determined by the battery cell configuration and the rating parameters of the individual battery cells.

The total number of series connected battery cells in a battery pack can be referred to as the S count; where 1S indicates a single cell, 2S indicate two cells in series, 3S for three cells in series, 4S for four in series cells, and so on for any number of series cells provided. Similarly, the total number of parallel connected battery cells in a battery pack can be referred to as the P count; where 1P indicates a single cell, 2P for two cells in parallel, 3P for three cells in parallel, and so on. A series-parallel configuration may be indicated by both S and P counts such as xxSyyP. For example, a 1S3P configuration includes a single series (1S) battery cell that is paralleled 3 times (3P) for a total of 3 cells, while a 4S2P configuration includes four series cells (4S) that are paralleled 2 times (2P) for a total of 8 cells.

The overall power available in a battery pack depends on the cell configuration and the cell parameters. The battery rating parameters typically include voltage (V) and capacity (C). An example battery cell may have a nominal voltage rating of 3.7V and a capacity of 2000 mAh. For this example, a 2S configuration may provide 7.4V (i.e., 3.7V×2) with a capacity of 2000 mAh, while a 2P configuration may provide 3.7V with a capacity of 4000 mAh (i.e., 2000 mAh×2), and a 3S3P configuration may provide 11.1V (i.e., 3.7V×3) with a capacity of 6000 mAh (i.e., 2000 mAh×3). Thus, a battery pack with a configuration given as xxSyyP provides an overall voltage rating (VR) determined from the individual cell voltage (V) as VR=xxV, and an overall capacity (CR) determined from the individual cell capacity (C) as CR=yyC. The voltage and load requirements for an electronic device will determine the appropriate cell configuration needed in a battery pack.

The present disclosure contemplates novel techniques to provide efficient power delivery to a system load from power sources such as batteries and battery packs. The disclosed solutions can be implemented with reduced circuit complexity when compared to conventional solutions, which improves reliability and reduces overall cost. The reduced power consumption achieved by the presently disclosed solutions may extend storage time of battery powered devices, since power consumption in storage and standby modes is greatly reduced. The disclosure made herein is presented with respect to these and other considerations.

SUMMARY

The techniques disclosed herein may achieve efficient regulation of power delivered from one or more batteries to a circuit or system with a power control device that has two or more operating modes. In a first operating mode, the power control device may select a first power circuit to deliver power to a system load with a first quiescent current, while in a second operating mode the power control device may select at least one additional power circuit to deliver power to the system load with a second quiescent current. The first quiescent current is significantly less than the second quiescent current such that operation of the first power circuit corresponds to a lower power mode than the additional power circuits. An ideal diode circuit may be configured to selectively couple the outputs of each of the power circuits to the system load.

In some examples, power control devices described herein may employ a state machine or modal topology to detect and control the selection of the specific power circuits that actively couple power to the system load.

In some additional examples, methods for power control device described herein may employ a state machine or modal topology to detect and control the selection of the specific power circuits that actively couple power to the system load.

The presently described techniques may realize solutions with reduced circuit complexity when compared to conventional solutions. Reduced parts cost, reduced manufacturing cost and improved reliability may thus be achieved. The reduced power consumption achieved by the presently disclosed solutions may extend storage time of battery powered devices, since power consumption in storage and standby modes may be greatly reduced.

In some embodiments, power control devices for a system operated from a battery are described, the power control devices comprising: a control logic circuit that is configured to detect a power state of the system and responsively provides one or more control signals to a control terminal; an ideal diode circuit that selectively couples power from one or more of a first power input terminal and a second power input terminal to a power output terminal responsive to one or more control signals from a control terminal, wherein the power output terminal is coupled to the system; a first power circuit that receives power from a power terminal of the battery and provides a first regulated power signal to the first power input terminal; and a second power circuit that receives power from the power terminal of the battery and selectively provides a second regulated power signal to the second power input terminal when activated responsive to the control signal from the control terminal, wherein power consumed by the second power circuit is higher than power consumption by the first power circuit.

In some additional embodiments, power control devices for a system operated from a battery are described, the power control devices comprising: a control logic circuit that is configured to detect a power state of the system and responsively provides one or more control signals to a control terminal; an ideal diode circuit that selectively couples power from one or more of a first power input terminal and a second power input terminal to a power output terminal responsive to one or more control signals from a control terminal, wherein the power output terminal is coupled to the system; a linear regulator circuit that receives power from a power terminal of the battery and provides a first regulated power signal to the first power input terminal, wherein the linear regulator circuit operates with a first quiescent current; and a switched-mode power supply circuit that receives power from the power terminal of the battery and selectively provides a second regulated power signal to the second power input terminal when activated responsive to the control signal from the control terminal, wherein the switched-mode power supply circuit operates with a second quiescent current that is substantially higher than first quiescent current.

Some embodiments describe methods for power control devices that are operated from a battery to deliver power to a system, the methods comprising: operating a state machine of the power control device in one of a first, second, and third operating modes; selectively coupling power from one or more of a primary power circuit and a secondary power circuit to the system based on the operating mode of the state machine; in the first operating mode: disabling one or more primary power circuits; enabling a secondary power circuit; monitoring system power; and when system power is detected ON, transitioning from the first operating mode to the second operating mode; in the second operating mode: enabling one or more primary power circuits; monitoring system power; and when system power is detected OFF, transitioning from the second operating mode to the third operating mode; in the third operating mode: starting a countdown timer; monitoring system power and the countdown timer; when the system power is detected ON prior to the countdown timer elapsing, transitioning from the third operating mode to the second operating mode; and when the system power is not detected ON and the shutdown timer elapsed, transitioning from the third operating mode to the first operating mode.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
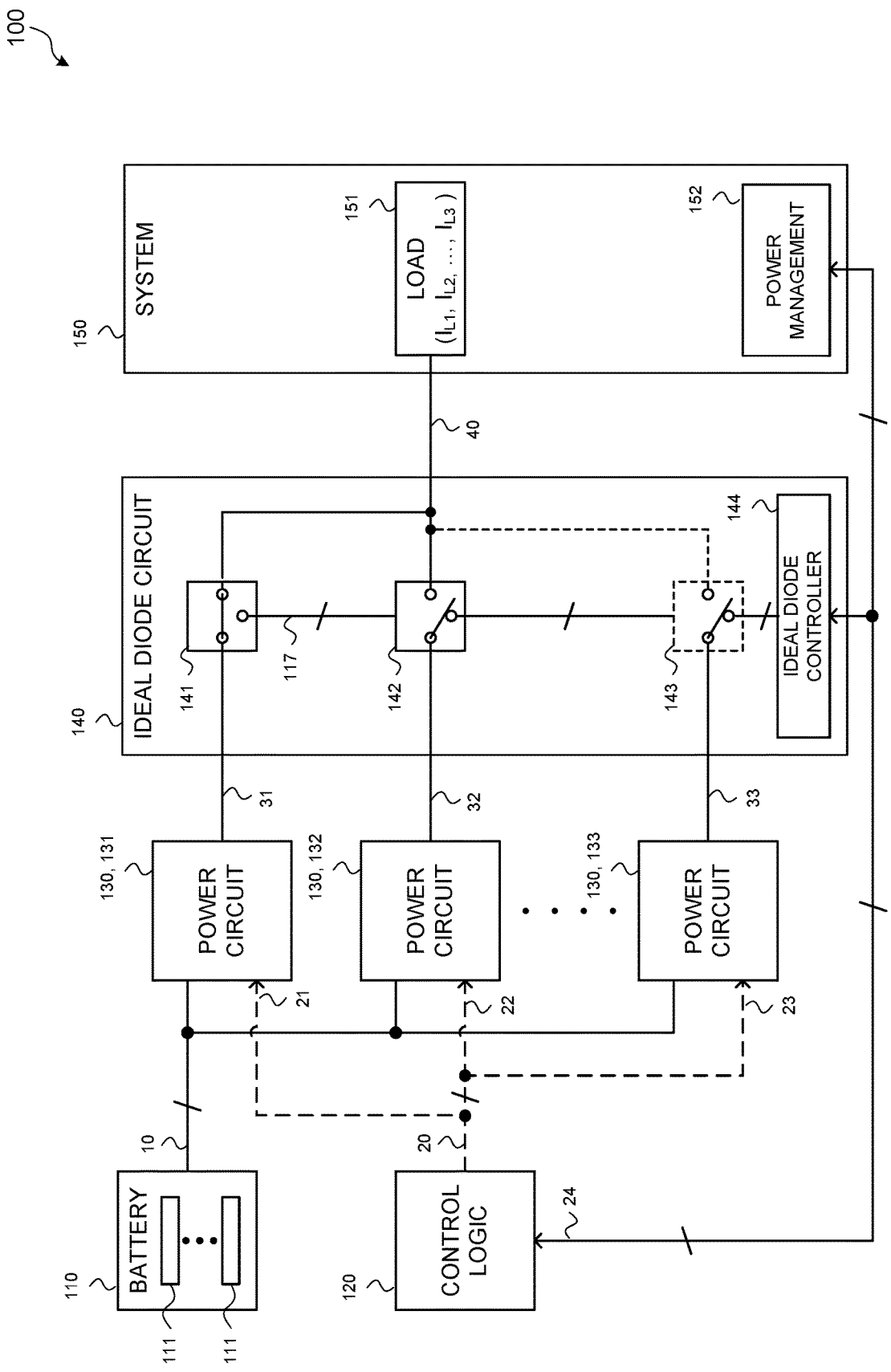
FIG. 1 schematically illustrates a first example battery powered circuit or system that is arranged in accordance with embodiments described herein.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a power, current, voltage, data, electric wave, magnetic wave, electromagnetic wave, or optical signal. Based upon context, the term "coupled" may refer to a wave or field coupling effect, which may relate to a corresponding optical field, magnetic field, electrical field, or a combined electromagnetic field.

The present disclosure contemplates novel techniques to provide efficient power delivery to a system load from power sources such as batteries and battery packs. The disclosed solutions can be implemented with reduced circuit complexity when compared to conventional solutions, which improves reliability and reduces overall cost. The reduced power consumption achieved by the presently disclosed solutions may extend storage time of battery powered devices, since power consumption in storage and standby modes is greatly reduced. The disclosure made herein is presented with respect to these and other considerations.

Efficient regulation of power delivered to a circuit or system may be provided with at least two operating modes. A first power circuit may be employed to deliver power to a system load with a first quiescent current, while at least one additional power circuit may be employed to deliver power to the system load with a second quiescent current. The first quiescent current is significantly less than the second quiescent current such that operation of the first power circuit corresponds to a lower power mode than the additional power circuits. An ideal diode circuit is configured to selectively couple the outputs of each of the power circuits to the system load.

A state machine can detect and control the selection of the specific power circuits that actively couple power to the system load. Power consumption in the resulting system and circuits may be greatly reduced by employing the disclosed techniques, as may be preferred in battery powered solutions. Circuit complexity is reduced when compared to conventional solutions, which additionally provides reduced cost and improved reliability. Moreover, storage time for an example battery powered circuit may be greatly extended since power consumption in storage and standby modes is reduced.

The above described features, techniques, and benefits, as well as others, will be more apparent in light of the additional details provided below.

FIG. 1 schematically illustrates a first example battery powered circuit or system 100 that is arranged in accordance with embodiments described herein. The illustrated example includes a battery 110, a control logic circuit 120, multiple power circuits 130, an ideal diode circuit 140, and a system 150.

Battery 110 may correspond to either a single cell battery, or a multiple cell battery in a battery pack that includes an array of individual (1S) battery cells 111. For a multiple cell battery pack, each of the plurality of individual cells 111 may be provided in a series (xxS), parallel (yyP), or combined series-parallel (xxSyyP) configurations. The power output of battery 110 may be provided at a battery power terminal 10, which may correspond to a single terminal, or a set of terminals for positive, negative, and ground (e.g., VP, VN, GND, etc.).

Control logic circuit 120 may correspond to a digital logic circuit that can be operated with power from battery 110 (connections not shown), provide one or more control signals to a control terminal 20, and monitor and/or provide feedback and control signals to/from system 150 and/or ideal diode circuit 140 at control terminal 24. The control logic circuit 120 may include any variety of combinational logic gates, latches, registers, and other functions as may be required to implement proper dynamic control of the various features described herein. In some examples, the control logic circuit 120 may be implemented in discrete components, while in other examples the control logic circuit may be implemented as integrated components such as in a programmable logic device (PLD), programmable logic array (PLA), field programmable gate array (FPGA), a micro-controller unit (MCU), or another integrated circuit (IC) type of solution. In various examples, the functions of the control logic circuit 120 may be used to implement a state machine with various operating states or modes as will be further described below.

Power circuits 130, may correspond to any number (N) of individual power circuits (e.g., 131, 132, . . . 133) as may be required in a system 150 to accommodate different system power efficiency and load requirements (e.g., load currents $I_{L1}$, $I_{L2}$, . . . $I_{L3}$). Thus, each of the power circuits 130 may be comprised of a linear regulator circuit, or a switched-mode power supply circuit as may be required. Each of the power circuits receives power from power terminal 10 of the battery, and may be selectively enabled, responsive to a corresponding control signal (e.g., $EN_1$, $EN_2$, . . . $EN_3$) from a corresponding one of the control terminals 20, 21, 22, and 23, to provide a corresponding regulated power signal to a corresponding one of the power input terminals 31, 32, and 33.

As illustrated in FIG. 1, each of a first power circuit 131, a second power circuit 132, and a third power circuit 133 may receive power from a power terminal 10 of the battery 110; where the first power circuit 131 provides a first regulated power signal to the first power input terminal 31, the second power circuit 132 provides a second regulated power signal to the second power input terminal 32, and the third power circuit 133 provides a third regulated power signal to the third power input terminal 33. Also as illustrated, the second power circuit 132 may be coupled to the control terminal 20 to receive a control signal 22 for selective activation, while the third power circuit 133 may be coupled to the control terminal 20 to receive another control signal 23 for selective activation. For the example of FIG. 1, the first power circuit 131 is always activated and does not have a control input; but in other examples the first power circuit 131 may be coupled to the control terminal 20 to receive another control signal 21 for selective activation.

Ideal diode circuit 140 includes a number of power input terminals designated as power input terminals 31, 32 and 33; and a common power output terminal designated as power output terminal 40. As illustrated, each of the power input terminals 31, 32 and 33 correspond to an output of one of the power circuits 130, 131, 132, and 133. The ideal diode circuit 140 also includes switch circuits 141, 142 and 143 and an ideal diode controller circuit 144. The inputs of the switch circuits 141, 142 and 143 are coupled to a corresponding one of the power input terminals 31, 32 and 33, and the outputs of the switch circuits are coupled together at a common power output terminal 40. The ideal diode controller circuit 144 has an input that is coupled to the control logic circuit at control terminal 24, and an output that is coupled to a select control terminal 117. Operationally, the ideal diode controller circuit 144 is configured by the control logic circuit 120 to selectively activate one or more of the switch circuits 141, 142 and 143 via select control signals at the select control terminal 117. When more than one of the switch circuits 141, 142 and/or 143 are active at the same time, the ideal diode circuit 140 effectively operates in an OR configuration, where the power is delivered to the common output terminal 40 in parallel from the active switch paths.

Active switches effectively provide a closed circuit to couple power from a corresponding one of the power input terminals to the power output terminal; while inactive (or deactivated) switches effectively provide an open circuit that decouples the corresponding power input terminal from the power output terminal. For example, activated switch circuit 141 couples power from power input terminal 31 to power output terminal 40, activated switch circuit 142 couples' power from power input terminal 32 to power output terminal 40, and activated switch circuit 143 couples power from power input terminal 33 to power output terminal 40. Thus, the ideal diode circuit 140 selectively couples power from one or more of a first power input terminal 31, a second power input terminal 32 and a third power input terminal 33, to a power output terminal 40 responsive to one or more control signals from the select control terminal 117.

System 150 is illustrated as including a load 151 and a power management circuit or 152, but is not so limited and may include many other circuits and functions. The load 151 is representative of the overall power consumption of the system 150, such as different amounts of load current demanded from the system (e.g., load currents $I_{L1}$, $I_{L2}$, . . . $I_{L3}$). The power management circuit or 152 provides various function that may be required to monitor, regulate and/or control power delivered to the system 150 for proper system load management, as well as other functions such as battery charging (not shown). Additionally, power management circuit 151 may provide one or more feedback signals to the control logic circuit 120, where the one or more feedback signals may be utilized to activate or deactivation various operating modes.

In some examples, the power management circuit 151 may be implemented with a PMIC or power management integrated circuit. A PMIC may provide a complement of power management features in a compact form. In a simple example, a PMIC may simply provide voltage regulation from the source voltage (e.g., a battery source or output of another power circuit) to the target voltage as may be required for system 150. Additional functions that may be provided by a PMIC include voltage, current, power, temperature, and fault condition monitoring for the system, where the PMIC can provide a feedback signal that is responsive to one or more of these monitored system conditions. For example, the PMIC may provide a feedback signal to indicate when a rising power supply (VDDIO RISING) is detected, a falling power supply (VDDIO FALLNG) is detected, a power ON condition (PON) is detected, or when a power OFF condition (POFF) is detected. Other faults may also be detected such as over-voltage, under-voltage, over-current, over-temperature, under-temperature, etc. In some examples, the PMIC may provide feedback signals to activate or deactivate storage modes. In other examples, the PMIC may also provide feedback signals that indicate changes in system power requirements based on detected changes in load current.

Figure 2:
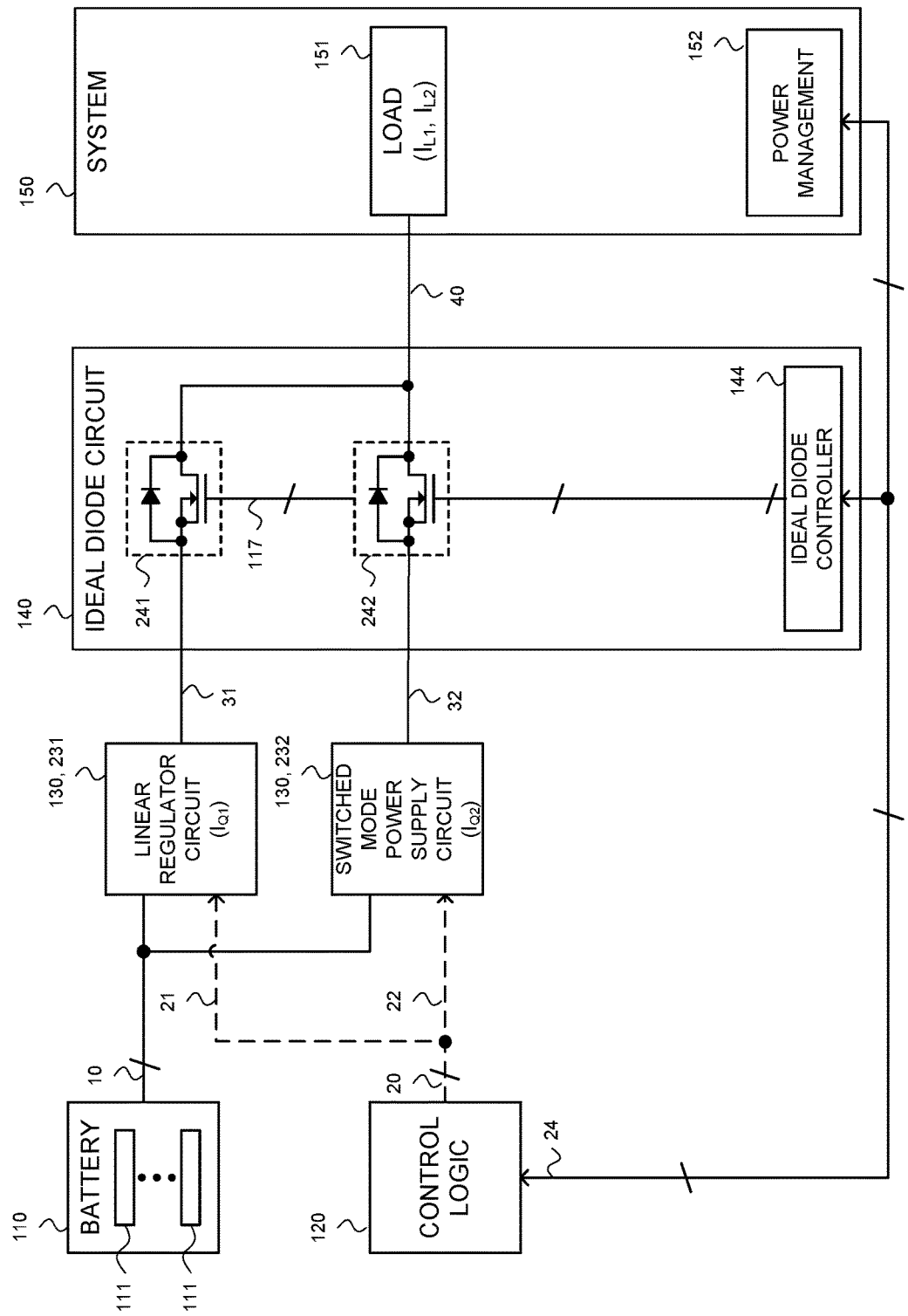
FIG. 2 schematically illustrates a second example battery powered circuit or system that is arranged in accordance with embodiments described herein.

FIG. 2 schematically illustrates a second example battery powered circuit or system 200 that is arranged in accordance with embodiments described herein. Similar to FIG. 1, the illustrated example of FIG. 2 includes a battery 110, a control logic circuit 120, multiple power circuits 130, an ideal diode circuit 140, and a system 150. However, the example of FIG. 2 has been simplified for two power circuits 150 as will become apparent in the below discussion.

As shown, a first power circuit 231 may correspond to a linear regular that is operated at a first quiescent current ($I_{Q1}$), while a second power circuit 232 may correspond to a switched-mode power supply that is operated at a second quiescent current ($I_{Q2}$). The first quiescent current ($I_{Q1}$) may be significantly lower that the second quiescent current ($I_{Q2}$) such that $I_{Q2} > I_{Q1}$. For example, a linear regulator circuit may have a first quiescent current ($I_{Q1}$) operated in a first range of about 1uA to about 200 uA, while a switched-mode power supply circuit may have a second quiescent current ($I_{Q2}$) operated in a second range of about 1 mA to about 200 mA. These values are merely example ranges, and not intended to be limiting. The selective operation of the linear regular 231 and the switched-mode power supply 232 via the operation of the control logic circuit and may thus facilitate lower and higher current load conditions (e.g., $I_{L1}$, $I_{L2}$, etc.) as may be required for system 150.

Example linear regulator circuits that may be used for the power circuits may include: a Zener diode circuit, a low-drop out regulator (LDO) circuit, a series regulator circuit, a shunt regulator circuit, or a combination thereof. Example switched-mode power supply circuits that may be used for the power circuits may include a DC-DC converter circuit, a boost regulator circuit, a buck regulator circuit, a buck-boost regulator circuit, or a combination thereof.

The ideal diode circuit 140 of FIG. 2 further illustrates that the first switch circuit 241 and the second switch circuit 242 may each includes a power MOS field effect transistor device (MOSFET) that are configured to operate in an ideal diode configuration. Example MOS devices may include p-type or n-type MOS devices that have a low voltage drop across their drain and source terminals when active, such as in a range of about 10 mV to about 200 mV. An ideal diode circuit may include additional components such as capacitors and Zener diodes that are configured to provide power supply filtering and protection for reverse bias conditions.

The MOS devices 241 and 242 are configured to emulate an ideal diode with a very low forward voltage drop and negligible reverse current. Additional desirable features may include low operating quiescent current, very low shutdown current, regulated forward voltage, and fast reverse current response. The MOS devices are connected in such a way that its body diode blocks reverse current when the MOS is turned OFF, and the forward voltage drop and power dissipation are low when the MOS is turned ON during forward conduction. The ideal diode controller 144 senses the reverse current through an active MOS device and turns it OFF, allowing the body diode to block reverse current.

Example ideal diode controllers may include the LM66100, LM66200, TPS2410 and TPS2419, which are manufactured by Texas Instruments. Ideal diode controllers are available in a variety of different configurations, where some include control for one, two or more MOS devices, and others include the MOS device(s) integrated together with the ideal controller. Thus the implementation of the ideal diode circuit 140 may be comprised of: a single integrated circuit for the ideal diode controller with integrated power MOS devices, a single integrated circuit for the ideal diode controller with external power MOS devices, multiple integrated circuits with each having their own ideal diode controller and integrated power MOS device, or multiple integrated circuits with each having their own ideal diode controller and external power MOS devices, or some of combination thereof.

The system 150 may be any electronic device or circuit that may require a battery powered solution. Some examples may include series coupled battery cells such as one (1S), two (2S), three (3S), four (4S) or more cells in series. In some example systems, a mobile processor device (not shown) in the system may require that the main voltage (e.g., VDD or VSYS) is maintained in a specific range of operation that corresponds to the voltage of a 1S battery pack. The mobile processor device may be sensitive to thermal dissipation and may thus require efficient conversion from the battery packs higher voltages to a 1S battery voltages. One problem presented by very efficient conversion is that the quiescent current (IQ) may be quite high (e.g., on the order of 100 μA to 500 μA or greater), even when the regulator is in pulse frequency modulation (PFM) mode. For example, a referenced product that was evaluated in contemplation of the present disclosure had a total quiescent current of about 400 uA in OFF mode, where 190 μA of the quiescent current was generated from regulation of a 2S battery voltage to a 1S voltage level.

As described and illustrated herein, two power circuits 130 can be placed in parallel, where an ideal diode circuit 140 is configured to select one or more of the two sources of the two power circuits 130 to deliver power to the load 151 of the system 150. The control circuit 120 can use a state machine and/or other combinational logic to decide when to enable or disable the primary power circuit (or other power circuits). For the example of FIG. 2, the primary power circuit may be a switched-mode power supply (SMPS) while the secondary power circuit may be a linear regulator such as a low drop-out regulator (LDO).

The control circuit 120 can be configured to detect when the system 150 is either in an OFF or ON conditional (e.g., POFF of PON) via feedback from any one of the power management circuit 152 of system 150 or the ideal diode controller 144 of the ideal diode circuit 140. Control circuit 120 can also be configured to determine when the system 150 is in an OFF condition for a certain amount of time before disabling the primary power circuit. The control circuit 120 can further be configured to detect a power ON condition such as when the system 150 commences a boot-up or power ON sequence, or some other power ON trigger event is detected (PON), where after the power ON condition is detected the primary power source may be enabled.

The overall quiescent current of the presently disclosed examples can yield a reduction of current (or power) consumption of up to 95% when compared to conventional solutions. This reduced power consumption may translate into months of additional shelf life (e.g., 2 to 6 additional months). Although power consumption and shelf life may be extended by simply using a 1S battery pack, this solution is impractical since in many applications system power delivery and load requirements dictate a battery pack selection of 2S or greater.

Conventional solutions attempt to reduce the quiescent current ($I_Q$) by using a PFM mode of operation for a buck regulator instead of a pulse width modulation or PWM mode. PFM mode can significantly reduce the power over PWM mode operation. However, the present disclosure recognizes that PFM mode regulation relies on a power supply topology that has inherent power consumption costs (increased $I_Q$) that are not present in linear regulators.

Other conventional solutions may use a switched capacitor voltage divider topology. In these switched capacitor solutions, two capacitors are initially connected in series for charging, and then the two capacitors are switched into a parallel configuration to result an output voltage that is half of the initial source voltage. The switched capacitor method may also have a high power consumption (increased $I_Q$) because the circuit is required to switch between the two states at a relatively high frequency to maintain a stable system output voltage. In one example, a switched capacitor topology had an $I_Q$ of about 400 µA, which is even larger than the IQ of a buck regulator in PFM mode. Additionally, switched capacitor solutions have practical limits on how much current can be provided without using an unreasonable amount of area for capacitors. The same amount of total output power of a switched capacitor solution can be achieved with the solutions described herein, with considerably less area used in the overall implementation.

The presently disclosed techniques provide a novel solution to power supplies while providing reduced quiescent current, reduced area or footprint, and reduced complexity. The presently disclosed solution splits the power supply design into two pieces. During normal active operation, a power supply such as a buck regulator may be used to efficiently supply power to the system. During low power operation, a linear regulator such as an LDO may be used to supply minimal power to the system. Although the linear regulator does not provide a large amount of power, it is able to provide enough power to keep the system operationally intact. For example, the linear regulator may provide sufficient power for registers in a power management circuit (e.g., PMIC) and a real time clock (RTC) to function reliably.

The solutions described herein thus have many benefits, including but not limited to, extended shelf life of products waiting in storage before activation, low quiescent current for devices that are in an inactive mode, and high-efficient power delivery to the system in active mode. Additional benefits may include reduced circuit complexity, reduced circuit area or footprint, and reduced costs of manufacture. The storage time is expected to go up an order of magnitude (e.g., double or more), and thus the device can sit longer in storage before needing to reset the system clock, which is critical for some users that may not activate these devices for prolonged periods of time.

Figure 3:
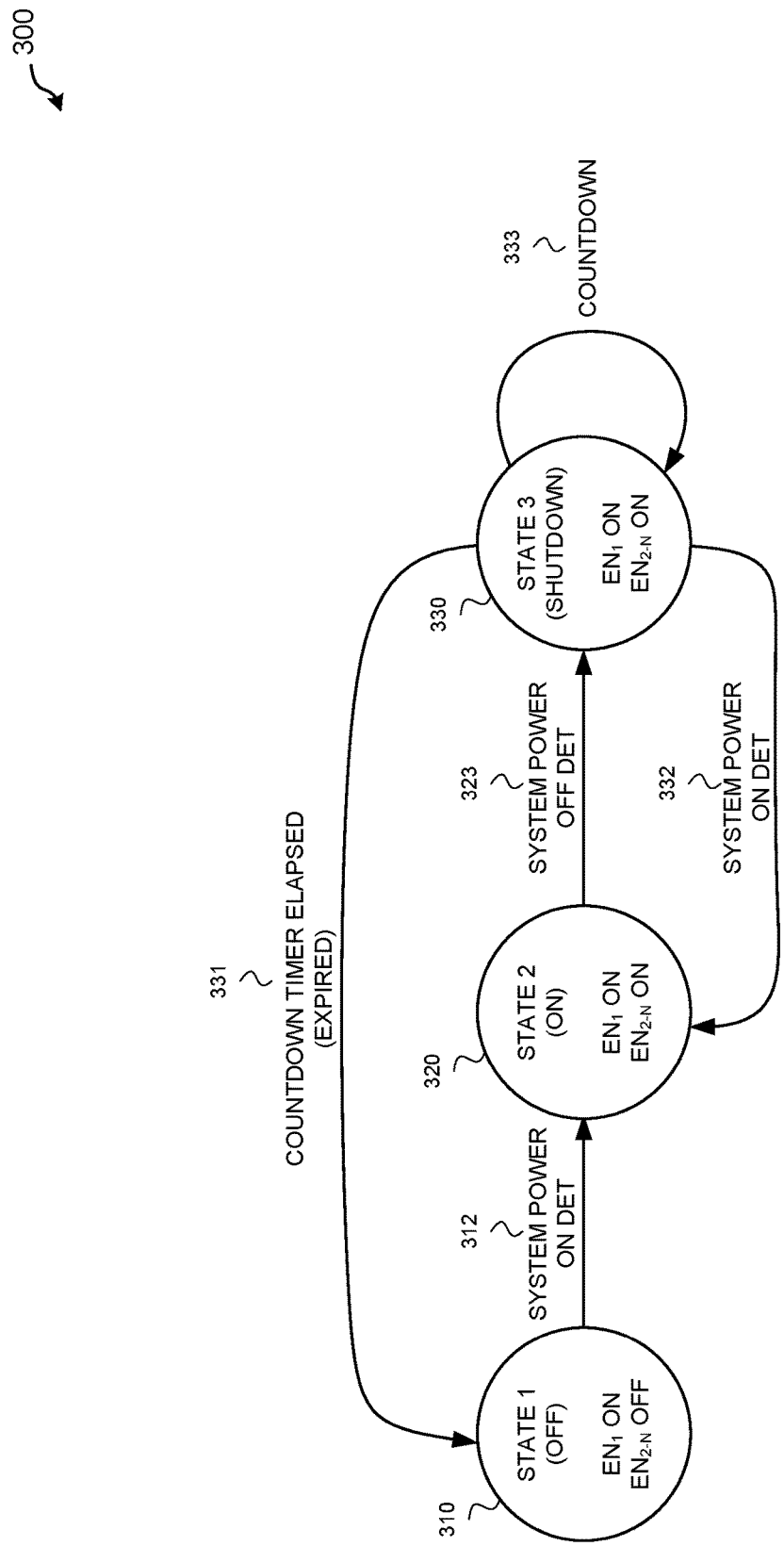
FIG. 3 illustrates a state diagram of an example battery powered circuit or system that is arranged in accordance with embodiments described herein.

FIG. 3 illustrates a state diagram 300 of an example battery powered circuit or system that is arranged in accordance with embodiments described herein. State diagram 300 includes three operating states designated as STATE 1, STATE 2 and STATE 3, which are managed by the control logic circuit 120.

In the first operating state (STATE 1, 310), the system is considered in an OFF mode. For this first operating state or OFF mode 310, the first power circuit is enabled or ON, and the other power circuits are disabled or OFF. In some examples, the first power circuit (e.g., 131) is always enabled in the OFF mode 310, while in other examples the first power circuit is enabled in the OFF mode 310 via a control signal (e.g., $EN_1$) being asserted (e.g., logic 1) by the control logic circuit 120. The other power circuits (e.g., 132, 133, etc.) are disabled in the OFF mode 310 via corresponding control signals (e.g., $EN_2, \ldots EN_N$) that are de-asserted (e.g., logic 0) by control logic circuit 120.

In the OFF mode 310, the ideal diode circuit 140 may couple the first power input terminal 31 to the power output terminal 40 responsive to one or more control signals from the control logic circuit 120. The control logic circuit 120 is also configured to monitor the system power status (e.g., via a feedback signal 24 from the PMIC and/or the ideal diode controller). When the system power status is detected as ON (312, SYSTEM POWER ON DET), the control logic circuit 120 transitions from the first operating state (STATE 1, 310) to the second operating state (STATE 2, 320).

In the second operating state (STATE 2, 320), the system is considered in an ON mode. For this second operating state or ON mode 320, the first power circuit and all other power circuits may be enabled or ON. In some examples, the first power circuit (e.g., 131) is always enabled in the ON mode 320, while in other examples the first power circuit is enabled in the ON mode 320 via a control signal (e.g., $EN_1$) being asserted (e.g., logic 1) by the control logic circuit 120. In still other examples, the first power circuit may be disabled in the ON mode 320 via a control signal (e.g., $EN_1$) being de-asserted (e.g., logic 0). The other power circuits (e.g., 132, 133, etc.) may be enabled in the ON mode 320 via corresponding control signals (e.g., $EN_2 \ldots EN_N$) that are asserted (e.g., logic 1) by control logic circuit 120.

In the ON mode 320, the ideal diode circuit 140 may couple both the first power input terminal 31 and the second power input terminal 32 to the power output terminal 40, responsive to the control signals from the control logic circuit 120. The control logic circuit 120 is also configured to monitor the system power status (e.g., via a feedback signal from the PMIC and/or the ideal diode controller) in the ON mode 320. When the system power status is detected as OFF (323, SYSTEM POWER OFF DET), the control logic circuit 120 transitions from the second operating state (STATE 2, 320) to the third operating state (STATE 3, 330) and a countdown timer initiates (e.g., timer is reset and the countdown commences).

In the third operating state (STATE 3, 330), the system is considered in a SHUTDOWN mode. For this third operating state or SHUTDOWN mode 330, the first power circuit and all other power circuits may remain in their current operation (e.g., enabled or ON) from the ON mode 320. In some examples the first power circuit (e.g., 131) remains enabled (e.g., if enabled in the ON mode), while in still other examples the first power circuit may remain disabled (e.g., if disabled in the ON mode). The other power circuits (e.g., 132, 133, etc.) remain enabled in the SHUTDOWN mode 330 via corresponding control signals (e.g., $EN_2$, ... $EN_N$), which remain asserted (e.g., logic 1) by control logic circuit 120.

In the SHUTDOWN mode 330, the ideal diode circuit 140 may continue to couple both the first power input terminal 31 and the second power input terminal 32 to the power output terminal 40, responsive to the control signals from the control logic circuit 120. The control logic circuit 120 is further configured to monitor the system power status (e.g., via feedback from the PMIC and/or the ideal diode controller) in the SHUTDOWN mode 330. While the system power status continues to be detected as OFF (333, COUNTDOWN) in the SHUTDOWN mode 330, the countdown timer continues to count down towards an expiration time. If the countdown timer reaches the expiration time (331, COUNTDOWN TIMER ELAPSED or EXPIRED) without detecting system power ON, then the control logic circuit 120 transitions from the third operating state (STATE 3, 330) to the first operating state (STATE 1, 310). However, if the system power is detected as ON (332, SYSTEM POWER OFF DET) in the SHUTDOWN mode 330 before the countdown timer expires, then control logic circuit 120 transitions from the third operating state (STATE 3, 330) to the second operating state (STATE 2, 320).

The expiration time can be adjusted based on a desired performance. For example, the expiration time can be quite short in power conservation modes (e.g., 15 seconds, 30 seconds, 1 minute, 2 minutes, 3 minutes, etc.), longer in moderate power usage modes (e.g., 5 minutes, 10 minutes, 15 minutes, 30 minutes), or very long in high power usage modes, (e.g., 1 hour, 2 hours, 3 hours, etc.). Although the above examples are described as countdown timers, any appropriate timer mechanism is equally appropriate. Thus, the timer could be configured to count up or down to trigger at a desired elapsed time.

Figure 4:
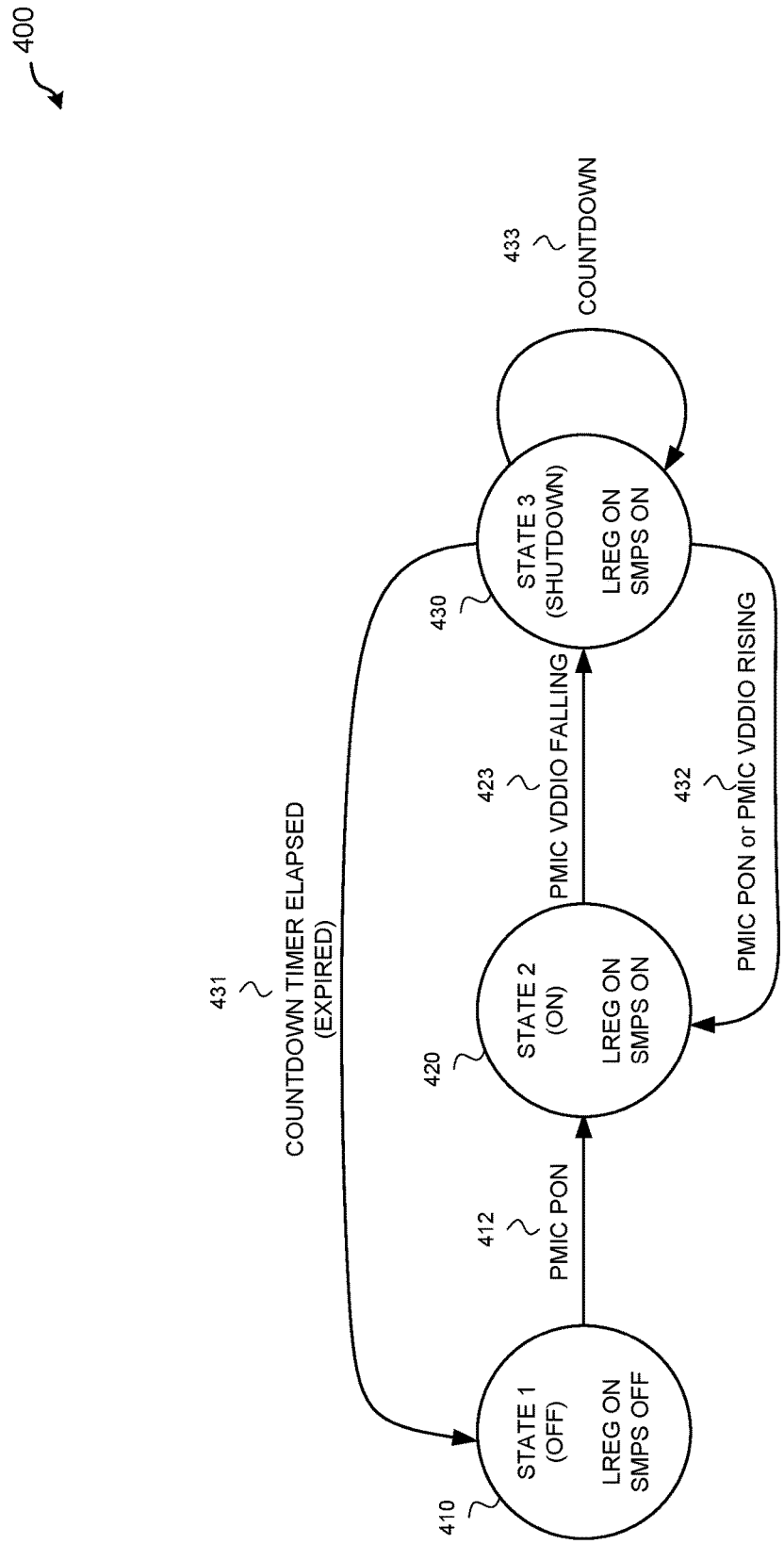
FIG. 4 illustrates another state diagram of another example battery powered circuit or system that is arranged in accordance with embodiments described herein.

FIG. 4 illustrates another state diagram 400 of another example battery powered circuit or system that is arranged in accordance with embodiments described herein. State diagram 400 includes three operating states designated as STATE 1, STATE 2 and STATE 3, which are managed by the control logic circuit 120. For the example of FIG. 4, the first power circuit may be a linear regulator circuit, the second power circuit may be a switched-mode power supply, the ideal diode circuit includes two power MOS devices, and the system includes a PMIC.

In the first operating state (STATE 1, 410), the system is considered in an OFF mode. For this first operating state or OFF mode 410, a linear regulator circuit such an LDO circuit may be enabled or ON, and a switched-mode power supply circuit may be disabled or OFF. In some examples, the linear regulator circuit (e.g., 231) is always enabled in the OFF mode 410, while in other examples the linear regulator circuit is enabled in the OFF mode 410 via a control signal (e.g., $EN_1$) being asserted (e.g., logic 1) by the control logic circuit 120. In still other examples, the linear regulator circuit may be disabled in the OFF mode 410 via a control signal (e.g., $EN_1$) being de-asserted (e.g., logic 0). The switched-mode power supply circuit (e.g., 232) is disabled in the OFF mode 410 via a corresponding control signal (e.g., $EN_2$) that is de-asserted (e.g., logic 0) by control logic circuit 120.

In the OFF mode 410, the ideal diode circuit 140 couples the first power input terminal 31 through a power MOS device 241 to the power output terminal 40 responsive to a control signals 117 from the ideal diode controller 144, where the one or more control signals 117 may be responsive to a control signals 24 from the control logic circuit 120. The control logic circuit 120 is also configured to monitor the system power status (e.g., via a feedback signal 24 from the PMIC and/or the ideal diode controller). When the system power status is detected as ON by a PMIC (412, PMIC PON), the control logic circuit 120 transitions from the first operating state (STATE 1, 410) to the second operating state (STATE 2, 420).

In the second operating state (STATE 2, 420), the system is considered in an ON mode. For this second operating state or ON mode 420, the linear regulator circuit and switched-mode power supply circuit may both be enabled or ON. In some examples, the linear regulator circuit (e.g., 231) is always enabled in the ON mode 420, while in other examples the linear regulator circuit is enabled in the ON mode 420 via a control signal (e.g., $EN_1$) being asserted (e.g., logic 1) by the control logic circuit 120. In still other examples, the linear regulator circuit may be disabled in the ON mode 420 via a control signal (e.g., $EN_1$) being de-asserted (e.g., logic 0). The switched-mode power supply circuit (e.g., 232) may be enabled in the ON mode 420 via a corresponding control signal (e.g., $EN_2$) that is asserted (e.g., logic 1) by control logic circuit 120.

In the ON mode 420, the ideal diode circuit 140 couples both the first power input terminal 31 and the second power input terminal 32 to the power output terminal 40 by operation of the first and second power MOS devices 241 and 242. The first and second power MOS devices 241 and 242 are responsive to one or more control signals 117 from the ideal diode controller 144. In some examples, the one or more control signals 117 may be generated by the ideal diode controller 144 responsive to one or more control signal 24 from the control logic circuit 120. The control logic circuit 120 is also configured to monitor the system power status (e.g., via feedback from the PMIC 152 and/or the ideal diode controller 144. When the system power status is detected as OFF (423, PMIC VDDIO FALLING), the control logic circuit 120 transitions from the second operating state (STATE 2, 420) to the third operating state (STATE 3, 430) and a countdown timer initiates (e.g., timer is reset and the countdown commences).

In the third operating state (STATE 3, 430), the system is considered in a SHUTDOWN mode. For this third operating state or SHUTDOWN mode, the linear regulator circuit 231 and the switched-mode power supply circuits 232 may remain in their current operation (e.g., enabled or ON) from the ON mode 420. In some examples, the linear regulator circuit 232 is remain enabled (e.g., if enabled in the ON mode) while in other examples the linear regulator circuit 232 remains disabled (e.g., if disabled in the ON mode). The switched-mode power supply circuit 232 remains enabled in the SHUTDOWN mode 430 via corresponding control signals ($EN_2$ ... $EN_N$), which remains asserted (e.g., logic 1) by control logic circuit 120.

In the SHUTDOWN mode 430, the ideal diode circuit 140 may continue to couple both the first power input terminal 31 and the second power input terminal 32 to the power output terminal 40, responsive to the control signals from the control logic circuit 120. The control logic circuit 120 is further configured to monitor the system power status via feedback from the PMIC 152 and/or the ideal diode controller 144. While the system power status continues to be detected as OFF (433, COUNTDOWN) in the SHUTDOWN mode 430, the countdown timer continues to count down towards an expiration time. If the countdown timer reaches the expiration time (431, COUNTDOWN TIMER ELAPSED or EXPIRED) without detecting system power ON, then the control logic circuit 120 transitions from the third operating state (STATE 3, 430) to the first operating state (STATE 1, 410). However, if the system power is detected as ON by the PMIC (432, PMIC PON or PMIC VDDIO RISING) in the SHUTDOWN mode 430 before the countdown timer expires, then control logic circuit 120 transitions from the third operating state (STATE 3, 430) to the second operating state (STATE 2, 420).

As previously described, the expiration time can be adjusted based on a desired performance. For example, the expiration time can be quite short in power conservation modes (e.g., 15 seconds, 30 seconds, 1 minute, 2 minutes, 3 minutes, etc.), longer in moderate power usage modes (e.g., 5 minutes, 10 minutes, 15 minutes, 30 minutes), or very long in high power usage modes, (e.g., 1 hour, 2 hours, 3 hours, etc.). Although the above examples are described as countdown timers, any appropriate timer mechanism is equally appropriate. Thus, the timer could be configured to count up or down to trigger at a desired elapsed time.

Figure 5:
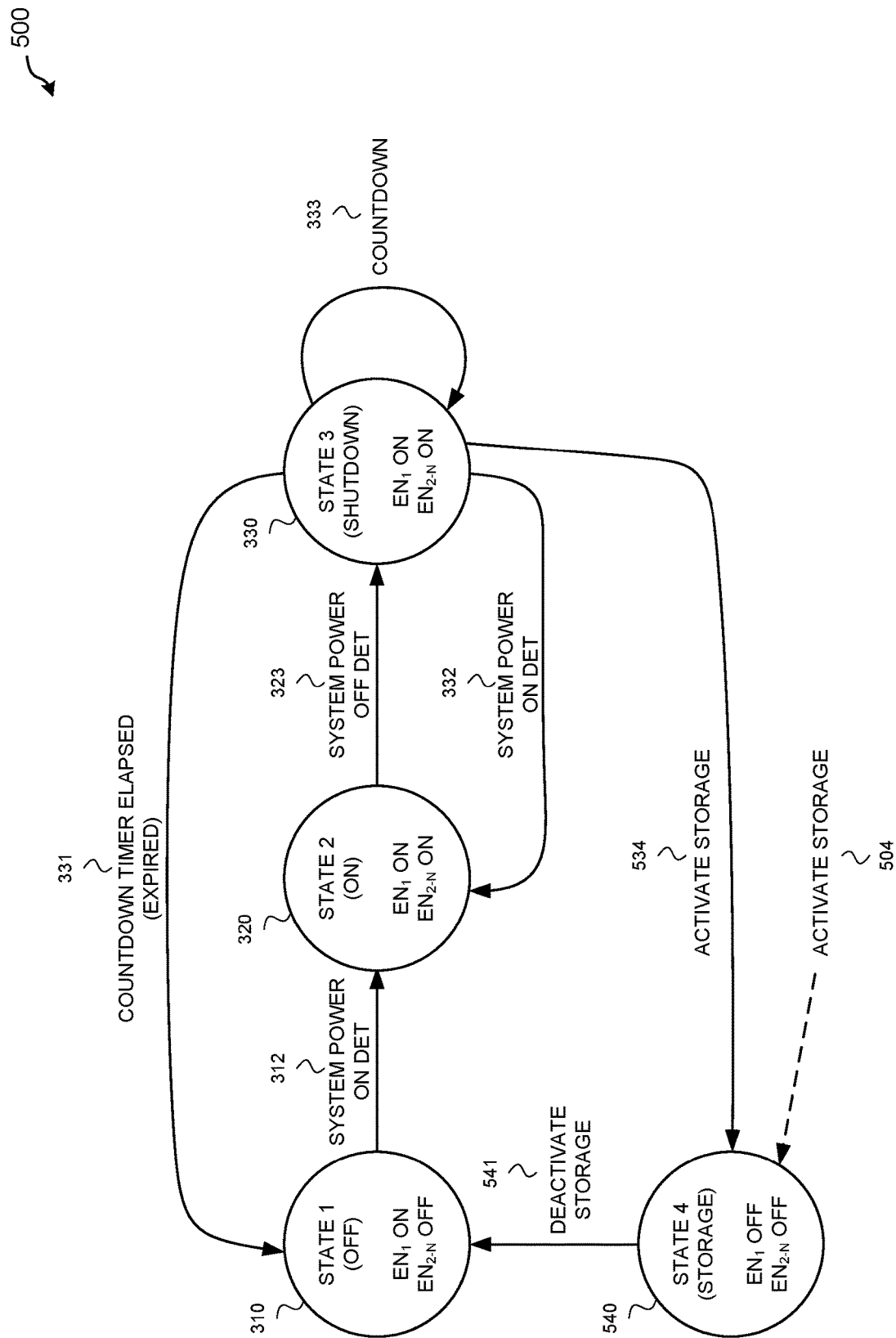
FIG. 5 illustrates still another state diagram of still another example battery powered circuit or system that is arranged in accordance with embodiments described herein.

FIG. 5 illustrates still another state diagram 500 of still another example battery powered circuit or system that is arranged in accordance with embodiments described herein. The example state diagram 500 of FIG. 5 is substantially similar to the state diagram 300 of FIG. 3, with like components labeled identically. State diagram 500 further includes a fourth operating state designated as STATE 4.

In the fourth operating state (540, STATE 4), the system is considered in a STORAGE mode. For this fourth operating state or STORAGE mode 540, the system is power is OFF and all of the power circuits are disabled or OFF. The first power circuit (e.g., 131) may be disabled in the STORAGE mode 540 via a control signal (e.g., $EN_1$) being de-asserted (e.g., logic 0) by the control logic circuit 120. The other power circuits (e.g., 132, 133, etc.) may be disabled in the STORAGE mode 540 via corresponding control signals (e.g., $EN_2, \ldots EN_N$) that are de-asserted (e.g., logic 0) by control logic circuit 120. The control logic circuit 120 may also be configured to monitor the system status (e.g., via a feedback signal 24 from the PMIC and/or the ideal diode controller or via a direct monitoring of other circuits such as a power switch).

In the STORAGE mode 540, power is conserved since the power circuits are disabled and no (or minimal) power is delivered to the system 150. The STORAGE mode 540, may be deactivated by a number of mechanism such as any mechanical, electrical, electro-mechanical or software based mechanism. In one example, STORAGE mode 540 is activated as part of a post-production factory initialization (504, ACTIVATE STORAGE) via either a software or hardware based initialization. In another example, STORAGE mode 540 is activated via either a software or hardware based initialization that is may be initiated from any other operating state of the control logic circuit 120 (e.g., 534, ACTIVATE STORAGE). In some examples, the system 150 may be a portable device such as a laptop computer that is intentionally placed into a long term storage mode by a system administrator, when the portable device is expected to be inactive or unused for a prolonged period of time.

In the STORAGE mode 540, the control logic circuit 120 may transition from the fourth operating state (540, STORAGE) to the first operating state (310, STATE 1) or OFF mode, when the STORAGE mode is deactivated (541, DEACTIVATE STORAGE). For example, a system 150 may be activated when the system power initializes after a power button is pressed for a first time since the portable device left the factory or otherwise leaves prolonged storage. In other examples, a software mechanism may be employed to deactivate the storage mode.

Figure 6:
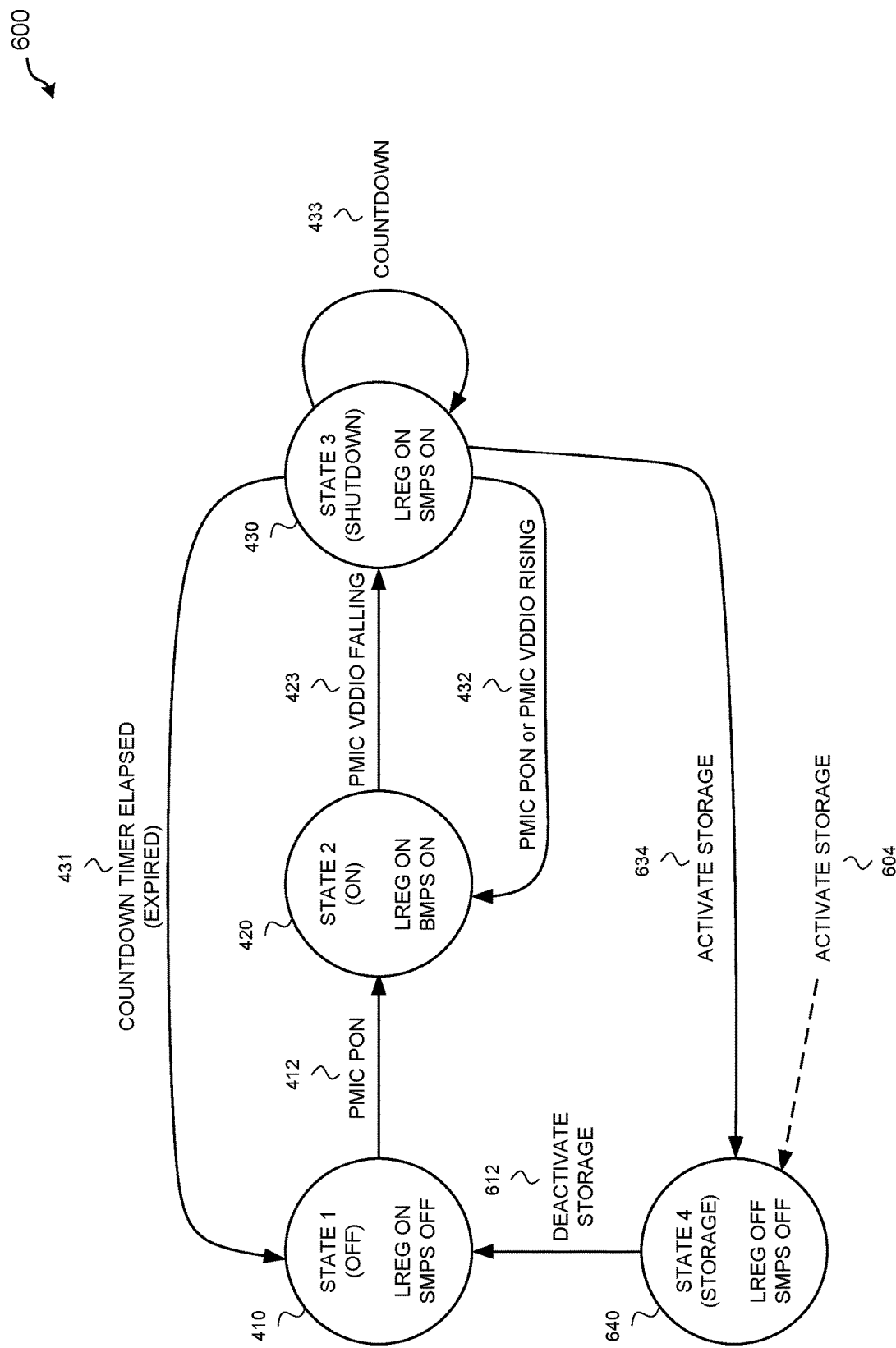
FIG. 6 illustrates yet another state diagram of yet another example battery powered circuit or system that is arranged in accordance with embodiments described herein.

FIG. 6 illustrates yet another state diagram 600 of yet another example battery powered circuit or system that is arranged in accordance with embodiments described herein. The example state diagram 600 of FIG. 6 is substantially similar to the state diagram 400 of FIG. 4, with like components labeled identically. State diagram 600 further includes a fourth operating state designated as STATE 4.

In the fourth operating state (640, STATE 4), the system is considered in a STORAGE mode. For this fourth operating state or STORAGE mode 640, the system is power is OFF and all of the regulator circuits are disabled or OFF. The linear regulator circuit (e.g., 231) may be disabled in the STORAGE mode 640 via a control signal (e.g., $EN_1$) being de-asserted (e.g., logic 0) by the control logic circuit 120. The switched-mode power supply circuit (e.g., 232) may be disabled in the STORAGE mode 540 via a corresponding control signals (e.g., $EN_2$) that is de-asserted (e.g., logic 0) by control logic circuit 120. The control logic circuit 120 may also be configured to monitor the system status (e.g., via a feedback signal 24 from the PMIC and/or the ideal diode controller or via a direct monitoring of other circuits such as a power switch).

In the STORAGE mode 640, power is conserved since the power supply circuits are disabled and no (or minimal) power is delivered to the system 150. The STORAGE mode 640, may be deactivated by a number of mechanism such as any mechanical, electrical, electro-mechanical or software based mechanism. In one example, STORAGE mode 640 is activated as part of a post-production factory initialization (604, ACTIVATE STORAGE) via either a software or hardware based initialization. In another example, STORAGE mode 640 is activated via either a software or hardware based initialization that may be initiated from any other operating state of the control logic circuit 120 (e.g., 634, ACTIVATE STORAGE). In some examples, the system 150 may be a portable device such as a laptop computer that is intentionally placed into a long term storage mode by a system administrator, when the portable device is expected to be inactive or unused for a prolonged period of time.

In the STORAGE mode 640, the control logic circuit 120 may transition from the fourth operating state (640, STORAGE) to the first operating state (410, STATE 1) or OFF mode, when the STORAGE mode is deactivated (612, DEACTIVATE STORAGE). For example, a system 150 may be activated when the system power initializes after a power button is pressed for a first time since the portable device left the factory or otherwise leaves prolonged storage. In other examples, a software mechanism may be employed to deactivate the storage mode.

Figure 7:
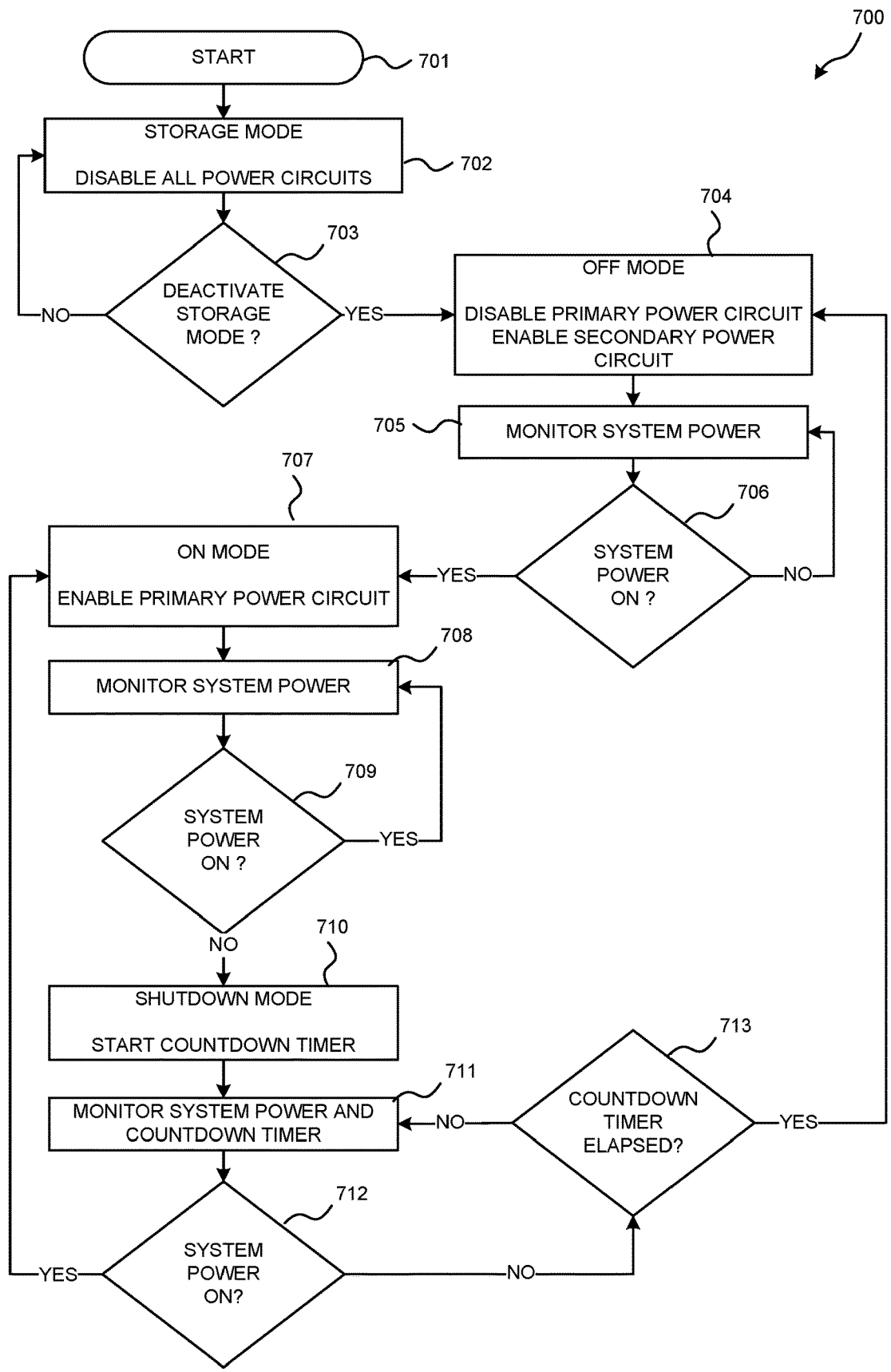
FIG. 7 is a flow chart illustrating an example process for various example battery powered circuits or systems that are arranged in accordance with embodiments described herein.

FIG. 7 is a flow chart illustrating an example process 700 for various example battery powered circuits or systems that are arranged in accordance with embodiments described herein. The process 700 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

The described processes and methods may be implemented as a portion of a power control device, which may include a control logic circuit that interfaces with multiple power circuits, an ideal diode circuit and a system as previously described herein. The system may correspond to a portable electronic device such as a laptop computer, a body worn device such as a VR headset or head mounted display (HMD) device, or another portable electronic device. In some examples, the power control device may be configured to operate in operating modes, including but not limited to the first, second, third and fourth operating modes previously described above. Optionally, the power control device may also be configured to exclude the fourth operating mode from some implementations.

At block 702, a STORAGE mode is activated by a power control device that is operated from a battery, where the power control device may be configured to disable all power circuits effective to reduce power consumption by the system. A method employed by the power control device at block 702 may include one or more of: initializing the state machine of the power control device in a storage mode (STORAGE), and disabling the primary and secondary power circuits.

At block 703, signals are monitored by the power control device to determine whether to deactivate a STORAGE mode (DEACTIVATE STORAGE MODE) or remain in the STORAGE mode. The method may continue from block 703 to block 702 when the power control device remains in the STORAGE mode. Alternatively, the method may continue from block 703 to block 704 when the power control device transitions from the storage mode to a first operating mode (e.g., OFF) when the STORAGE mode is deactivated. The method employed by the power control device in the storage mode may thus include transitioning from the storage mode to the first operating mode (e.g., OFF) when the storage mode is deactivated.

At block 704, an OFF mode is activated by the power control device, where the power control device may be configured to enable a secondary power circuit (e.g., a linear regulator circuit) and disable the primary power circuit (e.g., a SMPS circuit). A method employed by the power control device at block 704 may thus include: disabling the one or more primary power circuits and enabling a secondary power circuit. At block 705 in the OFF mode, system power is monitored by the power control device. A method employed by the power control device at block 705 may thus include monitoring system power. At block 706, the method evaluates the signals monitored by the power control device. The method may continue from block 706 to block 705 when the power control device remains in the OFF mode. Alternatively, the method may continue from block 706 to block 707 when the power control device transitions from the OFF mode to an ON mode when the when system power is detected ON. The method employed by the power control device at block 706 may thus include transitioning from the first operating mode (OFF) to a second operating mode (ON) when system power is detected ON.

At block 707, an ON mode is activated by the power control device, where the power control device may be configured to enable one or more primary power circuits (e.g., switched-mode power supply circuits). A method employed by the power control device at block 707 may thus include: enabling one or more primary power circuits and enabling a secondary power circuit. At block 708 in the ON mode, system power is monitored by the power control device. A method employed by the power control device at block 708 may thus include monitoring system power. At block 709, the method evaluates the signals monitored by the power control device. The method may continue from block 709 to block 708 when the power control device remains in the ON mode. Alternatively, the method may continue from block 709 to block 710 when the power control device transitions from the ON mode to a SHUTDOWN mode when system power is detected OFF. The method employed by the power control device at block 709 may thus include transitioning from the second operating mode (ON) to a third operating mode (SHUTDOWN) when system power is detected OFF.

At block 710, a SHUTDOWN mode is activated by the power control device, where the power control device continues to enable one or more primary power circuits (e.g., switched-mode power supply circuits) and start or commence a count-down timer. A method employed by the power control device at block 710 may thus include: resetting or starting a countdown timer. At block 711 in the SHUTDOWN mode, system power and the shutdown timer is monitored by the power control device. A method employed by the power control device at block 711 may thus include monitoring system power and monitoring a shutdown timer (or countdown timer). At block 712, the method evaluates the signals monitored by the power control device. The method may continue from block 712 to block 713 when the system power remains detected OFF. Alternatively, the method may continue from block 712 to block 707 when the system power is detected ON, where the power control device transitions from the SHUTDOWN mode to the ON mode when system power is detected ON. The method continues from block 713 to block 711 when the countdown timer has not fully elapsed, so that the countdown continues. Alternatively, the method continues from block 713 to block 704 when the countdown timer has fully elapsed and has thus expired. The method employed by the power control device at block 712 may thus include: when the system power is detected ON prior to the countdown timer elapsing, transitioning from the third operating mode (SHUTDOWN) to the second operating mode (ON). The method employed by the power control device at block 713 may thus include: when the system power is not detected ON and the shutdown timer elapsed, transitioning from the third operating mode (SHUTDOWN) to the first operating mode (OFF).

The disclosure presented herein also encompasses the subject matter set forth in the following clauses:

Example Clause A: A power control device for a system (150) operated from a battery (110), the device comprising: a control logic circuit (120) that is configured to detect a power state of the system (150) and responsively provides one or more control signals to a control terminal (20); an ideal diode circuit (140) that selectively couples power from one or more of a first power input terminal (31) and a second power input terminal (32) to a power output terminal (40) responsive to one or more control signals from a control terminal (20), wherein the power output terminal (40) is coupled to the system (150); a first power circuit (131) that receives power from a power terminal (10) of the battery (110) and provides a first regulated power signal to the first power input terminal (31); and a second power circuit (132) that receives power from the power terminal (10) of the battery (110) and selectively provides a second regulated power signal to the second power input terminal (32) when activated responsive to the control signal from the control terminal (20), wherein power consumed by the second power circuit is higher than power consumption by the first power circuit.

Example Clause B: The power control device of the preceding clauses, the control logic circuit comprising a state machine (300) that is configured to operate in either a first operating state (STATE 1, OFF) or a second operating state (STATE 2, ON), such that: in the first operating state (STATE 1, OFF), the ideal diode circuit (140) couples the first power input terminal (31) to the power output terminal (40) responsive to the one or more control signals; in the second operating state (STATE 2, ON), the ideal diode circuit (140) couples the second power input terminal (32) to the power output terminal (40) responsive to the one or more control signals; and when system power is detected ON (312) in the first operating state (STATE 1, OFF), the state machine transitions to the second operating state (STATE 2, ON).

Example Clause C: The power control device of any of the preceding clauses, wherein the state machine (300) is further configured to operate in a third operating state (STATE 3, SHUTDOWN) such that: when system power is detected OFF (323) in the second operating state (STATE 2, ON), the state machine transitions to the third operating state (STATE 3, SHUTDOWN) and a countdown timer is initiated; and when system power remains detected OFF (333) in the third operating state (STATE 3, SHUTDOWN), the countdown timer continues.

Example Clause D: The power control device of any of the preceding clauses, wherein the state machine (300) is further configured such that: when system power is detected ON (332) before the countdown timer expires in the third operating state (STATE 3, SHUTDOWN), the state machine transitions to the second operating state (STATE 2, ON); and when system power remains detected OFF (333) in the third operating state (STATE 3, SHUTDOWN) and the countdown timer expires, the state machine transitions to the first operating state (STATE 1, OFF).

Example Clause E: The power control device of any of the preceding clauses, the control logic circuit (120) comprising a state machine (500) that is configured to operate in either a first operating state (STATE 1, OFF), or a second operating state (STATE 2, ON), or a fourth operating state (STATE 4, STORAGE) such that: in the first operating state (STATE 1, OFF), the ideal diode circuit (140) couples the first power input terminal (31) to the power output terminal (40) responsive to the one or more control signals; in the second operating state (STATE 2, ON), the ideal diode circuit (140) couples the second power input terminal (32) to the power output terminal (40) responsive to the one or more control signals; in the fourth operating state (STATE 4, STORAGE) system power is OFF and all power circuits are deactivated; when storage is deactivated in the fourth operating state (STATE 4, STORAGE), the state machine transitions to the first operating state (STATE 1, OFF); and when system power is detected ON (312) in the first operating state (STATE 1, OFF), the state machine transitions to the second operating state (STATE 2, ON).

Example Clause F: The power control device of any of the preceding clauses, wherein the state machine (500) is further configured to operate in a third operating state (STATE 3, SHUTDOWN) such that: when system power is detected OFF (323) in the second operating state (STATE 2, ON), the state machine transitions to the third operating state (STATE 3, SHUTDOWN) and a countdown timer is initiated; and when system power remains detected OFF (333) in the third operating state (STATE 3, SHUTDOWN), the countdown timer continues.

Example Clause G: The power control device of any of the preceding clauses, wherein the state machine (500) is further configured such that: when system power is detected ON (332) before the countdown timer expires in the third operating state (STATE 3, SHUTDOWN), the state machine transitions to the second operating state (STATE 2, ON); when system power remains detected OFF (333) in the third operating state (STATE 3, SHUTDOWN) and the countdown timer expires, the state machine transitions to the first operating state (STATE 1, OFF); and when storage is activated (504, 534), the state machine transitions to the fourth operating state (STATE 4, STORAGE).

Example Clause H: The power control device of any of the preceding clauses, the battery comprising a plurality of battery cells that are configured either in series, parallel, or a combination thereof.

Example Clause I: The power control device of any of the preceding clauses, where the first power circuit comprises a linear regulator circuit corresponding to one or more of a Zener diode circuit, a low-drop out regulator circuit, a series regulator circuit, a shunt regulator circuit, or a combination thereof.

Example Clause J: The power control device of any of the preceding clauses, where the second power circuit comprises a switched-mode power supply (SMPS) circuit corresponding to one or more of a DC-DC converter circuit, a boost regulator circuit, a buck regulator circuit, a buck-boost regulator circuit, or a combination thereof.

Example Clause K: The power control device of any of the preceding clauses, wherein the first power circuit comprises a linear regulator circuit with a lower quiescent current, and wherein the second power circuit comprises a switched-mode power supply circuit with a higher quiescent current, wherein the higher quiescent current is substantially greater than the lower quiescent current.

Example Clause L: The power control device of any of the preceding clauses, wherein the first power circuit comprises a linear regulator circuit with a first quiescent current in a first range of about 1 μA to about 25 μA, and wherein the second power circuit comprises a switched-mode power supply circuit with a second quiescent current in a second range of about 100 uA to about 500 μA.

Example Clause M: The power control device of any of the preceding clauses, wherein the ideal diode circuit comprises: a first switch circuit configured to selectively couple the first power input terminal to the power output terminal; a second switch circuit configured to selectively couple the second power input terminal to the power output terminal; and an ideal diode controller circuit that is configured to selectively activate one or more of the first switch circuit and the second switch circuit based on the one or more control signals from the control logic circuit.

Example Clause N. The power device of any of the preceding clauses, wherein the first switch circuit and the second switch circuit each includes a power MOS field effect transistor (MOSFET) device.

Example Clause O: The power device of any of the preceding clauses, wherein the system includes a power management integrated circuit (PMIC) that receives power from the power output terminal, and delivers power to a load of the system, and provides a feedback signal to one or more of the control circuit and the ideal diode circuit.

Example Clause P: A power control device for a system (150) operated from a battery (110), the device comprising: a control logic circuit (120) that is configured to detect a power state of the system (150) and responsively provides one or more control signals to a control terminal (20); an ideal diode circuit (140) that selectively couples power from one or more of a first power input terminal (31) and a second power input terminal (32) to a power output terminal (40) responsive to one or more control signals from a control terminal (20), wherein the power output terminal (40) is coupled to the system (150); a linear regulator circuit (231) that receives power from a power terminal (10) of the battery (110) and provides a first regulated power signal to the first power input terminal (31), wherein the linear regulator circuit (231) operates with a first quiescent current (IQ1); and a switched-mode power supply circuit (232) that receives power from the power terminal (10) of the battery (110) and selectively provides a second regulated power signal to the second power input terminal (32) when activated responsive to the control signal from the control terminal (20), wherein the switched-mode power supply circuit (232) operates with a second quiescent current (IQ2) that is substantially higher than first quiescent current (IQ1).

Example Clause Q: The power control device of any of the preceding clauses, the control logic circuit (120) further comprising a state machine (400) configured to operate in either a first operating state (STATE 1, OFF), a second operating state (STATE 2, ON), or a third operating state (STATE 3, SHUTDOWN) such that: in the first operating state (STATE 1, OFF), the ideal diode circuit (140) couples the first power input terminal (31) to the power output terminal (40) responsive to the one or more control signals; in the second operating state (STATE 2, ON), the ideal diode circuit (140) couples the second power input terminal (32) to the power output terminal (40) responsive to the one or more control signals; when system power is detected ON (312) in the first operating state (STATE 1, OFF), the state machine transitions to the second operating state (STATE 2, ON); when system power is detected OFF (323) in the second operating state (STATE 2, ON), the state machine transitions to the third operating state (STATE 3, SHUTDOWN) and a countdown timer is initiated; when system power remains detected OFF (333) in the third operating state (STATE 3, SHUTDOWN), the countdown timer continues; when system power is detected ON (332) before the countdown timer expires in the third operating state (STATE 3, SHUTDOWN), the state machine transitions to the second operating state (STATE 2, ON); and when system power remains detected OFF (333) in the third operating state (STATE 3, SHUTDOWN) and the countdown timer expires, the state machine transitions to the first operating state (STATE 1, OFF).

Example Clause R: The power control device of any of the preceding clauses, the control logic circuit (120) further comprising a state machine (600) configured to operate in either a first operating state (STATE 1, OFF), a second operating state (STATE 2, ON), a third operating state (STATE 3, SHUTDOWN), or a fourth operating state (STATE 4, STORAGE) such that: the state machine (600) is initialized to the fourth operating state (STATE 4, STORAGE), where system power is OFF and both the linear power regulator circuit (231) and the power supply circuit (232) are disabled; in the first operating state (STATE 1, OFF), the ideal diode circuit (140) couples the first power input terminal (31) to the power output terminal (40) responsive to the one or more control signals; in the second operating state (STATE 2, ON) and the third operating state (STATE 3, SHUTDOWN), the ideal diode circuit (140) couples the second power input terminal (32) to the power output terminal (40) responsive to the one or more control signals; when the storage mode is deactivated (612) in the fourth operating state (STATE 4, STORAGE), the state machine transitions to the first operating state (STATE 1, OFF); when system power is detected ON (312) in the first operating state (STATE 1, OFF), the state machine transitions to the second operating state (STATE 2, ON); when system power is detected OFF (323) in the second operating state (STATE 2, ON), the state machine transitions to the third operating state (STATE 3, SHUTDOWN) and a countdown timer is initiated; when system power remains detected OFF (333) in the third operating state (STATE 3, SHUTDOWN), the countdown timer continues; when system power is detected ON (332) before the countdown timer expires in the third operating state (STATE 3, SHUTDOWN), the state machine transitions to the second operating state (STATE 2, ON); and when system power remains detected OFF (333) in the third operating state (STATE 3, SHUTDOWN) and the countdown timer expires, the state machine transitions to the first operating state (STATE 1, OFF).

Example Clause S: A method for a power control device that is operated from a battery (110) to deliver power to a system (150), the method comprising: operating a state machine of the power control device in one of a first, a second, and a third operating mode; selectively coupling power from one or more of a primary power circuit and a secondary power circuit to the system (150) based on the operating mode of the state machine; in the first operating mode (OFF): disabling (704) one or more primary power circuits; enabling (704) a secondary power circuit; monitoring (705) system power; and when system power is detected ON (706), transitioning from the first operating mode (OFF) to the second operating mode (ON); in the second operating mode (ON): enabling (707) one or more primary power circuits; monitoring (708) system power; and when system power is detected OFF (709), transitioning from the second operating mode (ON) to the third operating mode (SHUTDOWN); in the third operating mode (SHUTDOWN): starting (710) a countdown timer; monitoring (711) system power and the countdown timer; when the system power is detected ON (712) prior to the countdown timer elapsing (713), transitioning from the third operating mode (SHUTDOWN) to the second operating mode (ON); and when the system power is not detected ON (712) and the shutdown timer elapsed (713), transitioning from the third operating mode (SHUTDOWN) to the first operating mode (OFF).

Example Clause T: The method of any of the preceding clauses, further comprising initializing the state machine of the power control device in a fourth operating mode (STORAGE); in the fourth operating mode (STORAGE): disabling (702) the primary and secondary power circuits; and transitioning (703) from the fourth operating mode (STORAGE) to the first operating mode (OFF) when the fourth operating mode (STORAGE) is deactivated.

It will be understood that the configurations and/or approaches described herein are examples, and that these specific embodiments or examples are not to be considered in a limiting sense, because numerous variations are possible. As such, various system, circuits, and/or devices may be broken into additional functions or circuits, and/or combined with other functions or circuits as may be desirable in a specific implementation. Similarly, the specific routines, procedures or methods described herein may represent one or more of any number of processing strategies. As such, various acts illustrated and/or described may be performed in the sequence illustrated and/or described, in other sequences, in parallel, or omitted. Likewise, the order of the above-described processes or methods may be changed. The subject matter thus includes all novel and non-obvious combinations and sub-combinations of the methods, processes, circuits, devices, systems and configurations, and other features, functions and/or properties disclosed herein, as well as any and all equivalents thereof.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A power control device for a system operated from a battery, the device comprising:
   a control logic circuit that is configured to detect a power state of the system and responsively provides one or more control signals to a control terminal;
   an ideal diode circuit that selectively couples power from one or more of a first power input terminal and a second power input terminal to a power output terminal responsive to one or more control signals from a control terminal, wherein the power output terminal is coupled to the system;
   a first power circuit that receives power from a power terminal of the battery and provides a first regulated power signal to the first power input terminal; and
   a second power circuit that receives power from the power terminal of the battery and selectively provides a second regulated power signal to the second power input terminal when activated responsive to the control signal from the control terminal, wherein power consumed by the second power circuit is higher than power consumption by the first power circuit.

2. The power control device of claim 1, the control logic circuit comprising a state machine that is configured to operate in either a first operating state or a second operating state, such that:
   in the first operating state, the ideal diode circuit couples the first power input terminal to the power output terminal responsive to the one or more control signals;
   in the second operating state, the ideal diode circuit couples the second power input terminal to the power output terminal responsive to the one or more control signals; and
   when system power is detected ON in the first operating state, the state machine transitions to the second operating state.

3. The power control device of claim 2, wherein the state machine is further configured to operate in a third operating state such that:
   when system power is detected OFF in the second operating state, the state machine transitions to the third operating state and a countdown timer is initiated; and
   when system power remains detected OFF in the third operating state, the countdown timer continues.

4. The power control device of claim 3, wherein the state machine is further configured such that:
   when system power is detected ON before the countdown timer expires in the third operating state, the state machine transitions to the second operating state; and
   when system power remains detected OFF in the third operating state and the countdown timer expires, the state machine transitions to the first operating state.

5. The power control device of claim 1, the control logic circuit comprising a state machine that is configured to operate in either a first operating state, or a second operating state, or a fourth operating state such that:
   in the first operating state, the ideal diode circuit couples the first power input terminal to the power output terminal responsive to the one or more control signals;
   in the second operating state, the ideal diode circuit couples the second power input terminal to the power output terminal responsive to the one or more control signals;
   in the fourth operating state system power is OFF and all power circuits are deactivated;
   when storage is deactivated in the fourth operating state, the state machine transitions to the first operating state; and
   when system power is detected ON in the first operating state, the state machine transitions to the second operating state.

6. The power control device of claim 5, wherein the state machine is further configured to operate in a third operating state such that:
   when system power is detected OFF in the second operating state, the state machine transitions to the third operating state and a countdown timer is initiated; and
   when system power remains detected OFF in the third operating state, the countdown timer continues.

7. The power control device of claim 6, wherein the state machine is further configured such that:
   when system power is detected ON before the countdown timer expires in the third operating state, the state machine transitions to the second operating state;
   when system power remains detected OFF in the third operating state and the countdown timer expires, the state machine transitions to the first operating state; and
   when storage is activated, the state machine transitions to the fourth operating state.

8. The power control device of claim 1, the battery comprising a plurality of battery cells that are configured either in series, parallel, or a combination thereof.

9. The power control device of claim 1, where the first power circuit comprises a linear regulator circuit corresponding to one or more of a Zener diode circuit, a low-drop out regulator circuit, a series regulator circuit, a shunt regulator circuit, or a combination thereof.

10. The power control device of claim 1, where the second power circuit comprises a switched-mode power supply (SMPS) circuit corresponding to one or more of a DC-DC converter circuit, a boost regulator circuit, a buck regulator circuit, a buck-boost regulator circuit, or a combination thereof.

11. The power control device of claim 1, wherein the first power circuit comprises a linear regulator circuit with a lower quiescent current, and wherein the second power circuit comprises a switched-mode power supply circuit with a higher quiescent current, wherein the higher quiescent current is substantially greater than the lower quiescent current.

12. The power control device of claim 1, wherein the first power circuit comprises a linear regulator circuit with a first quiescent current in a first range of about 1 µA to about 25 µA, and wherein the second power circuit comprises a switched-mode power supply circuit with a second quiescent current in a second range of about 100 µA to about 500 µA.

13. The power control device of claim 1, wherein the ideal diode circuit comprises:
   a first switch circuit configured to selectively couple the first power input terminal to the power output terminal;
   a second switch circuit configured to selectively couple the second power input terminal to the power output terminal; and an ideal diode controller circuit that is configured to selectively activate one or more of the first switch circuit and the second switch circuit based on the one or more control signals from the control logic circuit.

14. The power control device of claim 13, wherein the first switch circuit and the second switch circuit each includes a power MOS field effect transistor (MOSFET) device.

15. The power control device of claim 1, wherein the system includes a power management integrated circuit (PMIC) that receives power from the power output terminal, and delivers power to a load of the system, and provides a feedback signal to one or more of the control circuit and the ideal diode circuit.

* * * * *